E. CHESLEY.
SAP SPILE OR SPOUT.
APPLICATION FILED APR. 29, 1913.
1,221,509.
Patented Apr. 3, 1917.
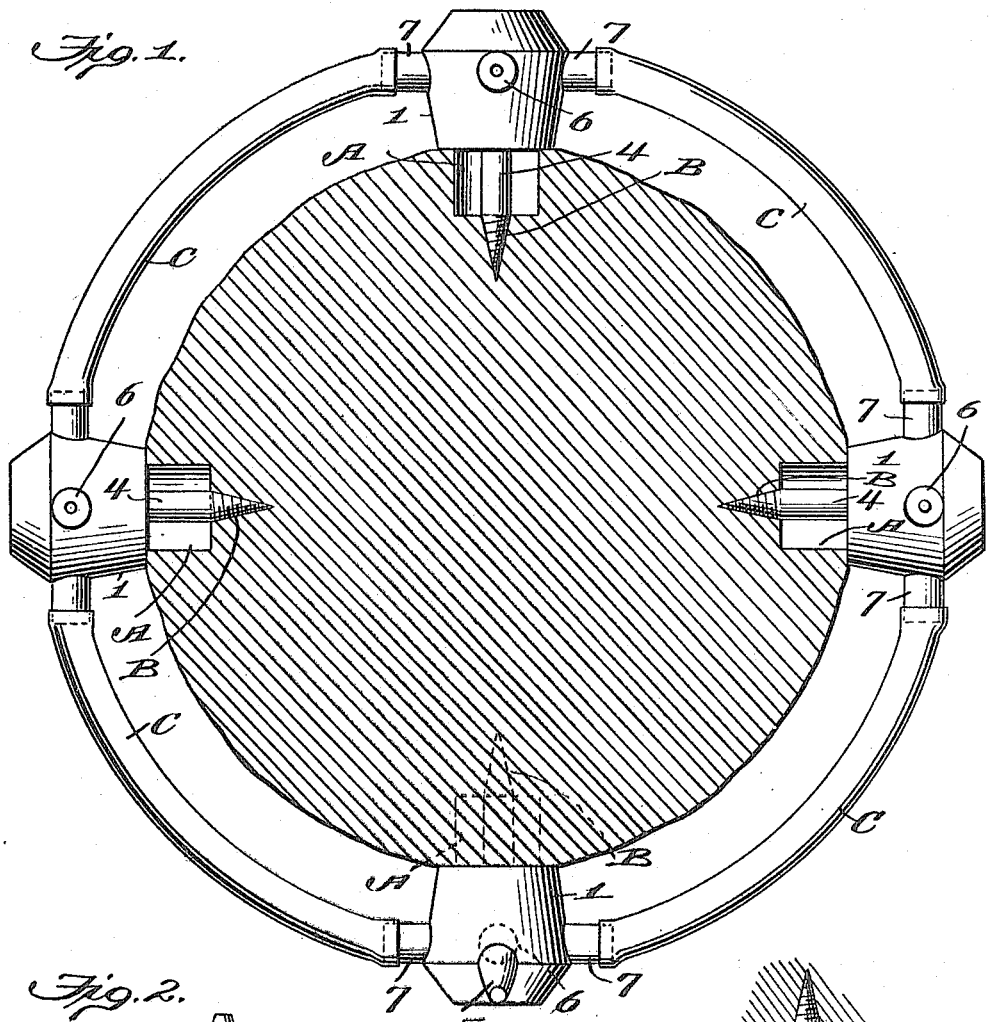
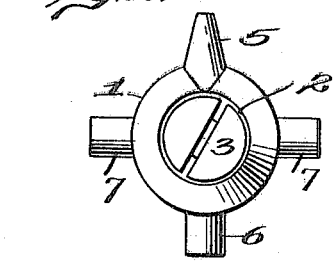
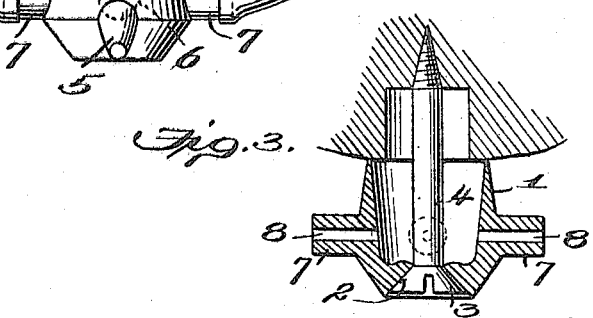
Inventor
Edward Chesley.

UNITED STATES PATENT OFFICE.

EDWARD CHESLEY, OF SWETNAM, VIRGINIA.

SAP SPILE OR SPOUT.

1,221,509.  Specification of Letters Patent.  Patented Apr. 3, 1917.

Application filed April 29, 1913. Serial No. 764,454.

*To all whom it may concern:*

Be it known that I, EDWARD CHESLEY, a citizen of the United States, residing at Swetnam, in the county of Fairfax and State of Virginia, have invented a new and useful Improvement in Sap Spiles or Spouts, of which the following is a specification.

This invention relates to improvements in sap spiles or spouts, and its principal objects are to provide a device which may be used without injury to the tree and which in no way interferes with the free flow of the sap; which provides for a rapid and efficient recovery of the sap; which may be used singly as on a small tree, or in aggroupment, as on a relatively large tree, and which, in either case, has the same features of construction; and which is inexpensive to manufacture and readily fitted to and removed from a sap-bearing tree.

An embodiment of the invention is illustrated in the accompanying drawings, wherein:—

Figure 1 is a view showing a plurality of spiles in accordance with the invention in inter-connected relation about the circumference of a tree.

Fig. 2 is a detail end elevation of a spile in which the features of the invention are incorporated;

Fig. 3 is a detail sectional view thereof. This figure, moreover, shows the relation of the spile to the tree which is to be bled.

Similar characters of reference designate corresponding parts throughout the several views.

The improved sap spile comprises a cup-shaped member 1 which has at its outer end a concentric opening 2 shaped to conformably receive the conical head 3 of a retaining screw 4, the said head thus closing the outer end of the spile when the latter is in use. The member 1 at its inner end is bluntly sharp; that is to say, at its inner end, which engages the tree to be bled, it is sufficiently blunt not to cut or penetrate the surface of the tree, but it is sufficiently sharp or regular to have efficient contact with said surface in order to prevent the loss of sap.

The member 1 is provided with a bucket lug 5 and with a sap discharge spout 6 opposite to said lug. Said member is also provided midway between said lug and sap spout and preferably at both sides thereof with laterally projecting nipples 7 having bores 8 which extend from their end faces and communicate with the interior of the member 1.

In the use of the spile, the dead bark is first removed and a suitable opening A is formed in the tree, *e. g.*, an opening seven-eighths of an inch in diameter and an inch in depth. The screw 4 is first inserted through the opening 2 in the spile and the end of its shank is thereafter engaged in the hole B inwardly of the opening A and formed by the worm of the auger bit, the hole B being located beyond the sap-bearing wood. The screw 3 is turned sufficiently into the wood to insure that the bluntly sharp inner edge of the member 1 shall engage the circumferential face of the tree in liquid-tight fashion without, however, substantially cutting into said surface.

If the tree to be bled is a small one which requires but one tap, the spile will be arranged with its bucket lug 5 projecting upwardly and its sap discharge spout 6 projecting downwardly. The nipples 7 which are pierced with the bores 8 of course facilitate discharge of sap through the spout 6, since they admit air into the member 1.

If the tree is a relatively large one, requiring several taps, a group of spiles are employed and the spiles are preferably arranged at different elevations. Thus, Fig. 1 assumes a tree, the size of which requires four spiles. The lowermost spile of the group is arranged in the manner above described; that is, with its bucket lug projecting upwardly and its spout 6 projecting downwardly. The other spiles of the group are, however, arranged in reverse fashion; that is, with their bucket lugs projecting downwardly or at their under sides and with their spouts 6 projecting upwardly or at their upper sides. The spiles are connected by means of sections of rubber tubing or the like C, the ends of which are fitted to the nipples 7, the sections of tubing extending between each pair of adjacent spiles. The sap drains from the lowermost spile, the discharge spout of which, as above stated, is directed downwardly. The discharge spouts of the other spiles, as above stated, are arranged at the upper side thereof, projecting upwardly, and serve to admit air into the interior of the spiles whereby the free drainage of sap is facilitated.

Having fully described my invention, I claim:—

1. A sap spile comprising a cup-shaped member having a bluntly sharp inner edge, a projecting spout, a projecting apertured nipple located at a distance from said spout, and a concentric opening in its outer end.

2. A sap spile comprising a cup-shaped member having a bluntly sharp inner edge, a projecting spout, a pair of oppositely disposed apertured nipples located at opposite sides of said spout and a concentric opening in its outer end.

3. A sap spile comprising a cup-shaped member having a bluntly sharp inner edge, a projecting spout and a concentric opening in its outer end, in combination with a fastening screw of substantially greater length than said member and having a conical head to which said opening conforms and which engages in said opening to close the outer end of the member.

EDWARD CHESLEY.

Witnesses:
L. SMITH,
N. C. DAVIS.

Copies of this patent may be obtained for five cents each, by addressing the "Commissioner of Patents, Washington, D. C."